United States Patent [19]

Wenger et al.

[11] 4,362,754
[45] Dec. 7, 1982

[54] METHOD OF FORMING SHAPED POTATO PRODUCTS

[75] Inventors: David R. Wenger, Grand Rapids; Kenneth R. Walsh, Saranac, both of Mich.

[73] Assignee: Werner Lehara, Inc., Grand Rapids, Mich.

[21] Appl. No.: 200,972

[22] Filed: Oct. 27, 1980

Related U.S. Application Data

[62] Division of Ser. No. 75,757, Sep. 14, 1979, abandoned.

[51] Int. Cl.³ .............................................. A21D 6/00
[52] U.S. Cl. .................................... 426/503; 425/362; 426/560; 426/517
[58] Field of Search ............... 426/550, 560, 503, 502, 426/438, 517; 425/362, 220, 373, 363, 369, 335, 336

[56] References Cited

U.S. PATENT DOCUMENTS

| | | | |
|---|---|---|---|
| 3,318,264 | 5/1967 | Weidenmiller | 425/362 |
| 3,469,540 | 9/1969 | Werner | 425/362 |
| 3,956,517 | 5/1976 | Curry et al. | 426/560 |
| 3,987,210 | 10/1976 | Cremer | 426/550 |
| 4,059,378 | 11/1977 | Sollich | 425/362 |

*Primary Examiner*—Raymond N. Jones
*Assistant Examiner*—George C. Yeung
*Attorney, Agent, or Firm*—Price, Heneveld, Huizenga & Cooper

[57] ABSTRACT

A method and apparatus for forming shaped potato products are disclosed, pursuant to which a die roll is disposed adjacent an opposed, coacting, counter-rotating feed roll. The feed roll includes a plurality of circumferentially spaced longitudinally extending grooves and the die roll defines a plurality of circumferentially extending longitudinally spaced, continuous grooves. The grooves on the die roll have opposed sidewalls which include alternating laterally zig-zag excursion so that strips of dough shaped therein have a crinkle configuration. A woven cotton belt is supported below the die roll and an adjustably positioned resilient pressure roll biases the belt into contact with a portion of the periphery of the die roll. A potato dough is forced into the grooves by the feed roll and compressed by the belt and pressure roll. When it separates from the die roll, the belt creates a suction which extracts a continuous strip of shaped food product from the die roll. The continuous strip of product may then be cut into individual lengths.

4 Claims, 8 Drawing Figures

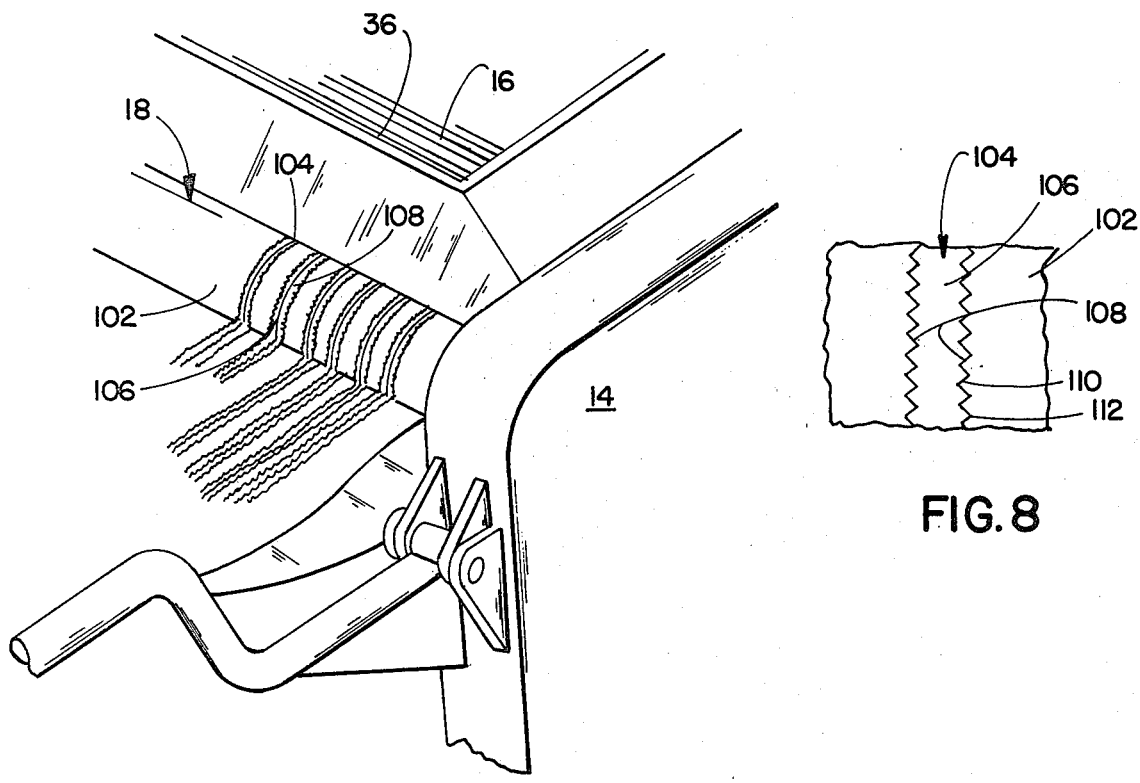
FIG. 7
FIG. 8
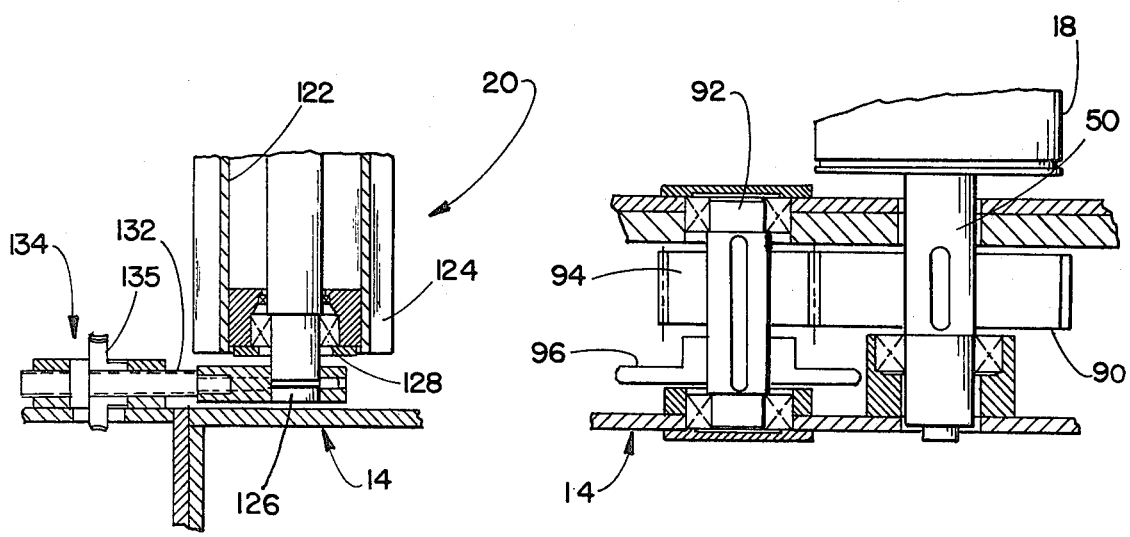
FIG. 4
FIG. 3

METHOD OF FORMING SHAPED POTATO PRODUCTS

This is a division of application Ser. No. 075,757, filed Sept. 14, 1979, abandoned as of the filing date hereof.

BACKGROUND OF THE INVENTION

The present invention relates to food product forming apparatus and more particularly to a unique rotary apparatus and method for forming shaped potato products on a continuous basis.

Various machines and/or methods have been proposed in the past for the fabrication of shaped potato food products. For example, machines have been developed for fabricating potato patties from potato shreds. An example of one such machine may be found in U.S. Pat. No. 3,589,308, entitled PATTY MAKING MACHINE and issued on June 29, 1971 to Verhoeven. A machine of the type disclosed in this patent is capable of fabricating generally rectangular in plan potato patties from a potato shred mixture. The machine includes a pair of opposed, counter-rotating compacting rollers and cooperating endless belts to fabricate a relatively wide strip of product.

Due to the physical characteristics of the various possible mixtures of potato dough or slurry materials, rotary die machines have not been employed to fabricate french fries from a potato dough. Certain economical advantages are obtained from forming a french fry-type product from a dough mixture. These advantages are primarily related to lack of waste and more complete use of the potato. A typical potato dough from which french fries may be formed would include peeled, sliced and cooked potatoes which are riced through a grinder and then mixed with potato flakes, binders and seasonings. Heretofore, the potato industry has mass-produced only a single type of french fry from such a dough material on a continuous basis. French fries are produced either in a square or rectangular shape or as crinkle cut shapes having high and low ridges. The crinkle cut french fry may be more appealing to the consumer and due to its larger surface area may be crispy when fried. Screw piston-type extruders have been employed to fabricate a rectangular or square shaped or plain french fry only. Further, roll-type extruders manufactured by the assignee of the present invention have also been employed to fabricate such plain french fry products. These machines and the machine of the type disclosed in the aforementioned U.S. Pat. No. 3,589,308 are incapable of fabricating on a continuous basis a french fry having a crinkle cut shape.

SUMMARY OF THE INVENTION

In accordance with the present invention, a unique rotary apparatus is provided for fabricating either plain or crinkle cut (or other specially-shaped) french fries on a continuous basis from a standard potato dough. Essentially, the apparatus consists of opposed, counter-rotating rolls adjustably positioned with respect to each other to define a nip. One of the rolls is a longitudinally ridged or grooved feed roll and the other is a die roll having a surface configured to produce the end product shape. An endless belt is biased into engagement with a portion of the periphery of the die roll by an adjustably positioned pressure roll.

When used to fabricate french fry products, the die roll includes a plurality of circumferentially extending, longitudinally spaced grooves the sidewalls of which are shaped to define the longitudinal edges of the desired product. The dough or potato feed material is forced into the die roll by the grooved feed roll and compacted therein by the pressure applied to the die roll through the belt by the adjustable pressure roll. When the belt separates from the die roll, a suction or vacuum is created which extracts the formed product on a continuous basis.

In narrower aspects of the invention, provision is made for varying the speed of rotation of the grooved roll relative to the die roll in order to control the compression or density of the product. Further, a stripper device is supported above the die roll and includes fingers extending into the grooves to strip any shaped potato product which may not have been extracted by the suction created by the belt.

BRIEF DESCRIPTION OF THE DRAWINGS

FIG. 3 is a fragmentary, cross-sectional view showing the die roll drive;

FIG. 4 is a fragmentary, cross-sectional view showing a pressure roll and means for adjusting same;

FIG. 7 is a fragmentary, perspective view of the apparatus in accordance with the present invention; and FIG. 8 is a fragmentary view of the die roll.

DETAILED DESCRIPTION OF THE PREFERRED EMBODIMENT

Figure 1:
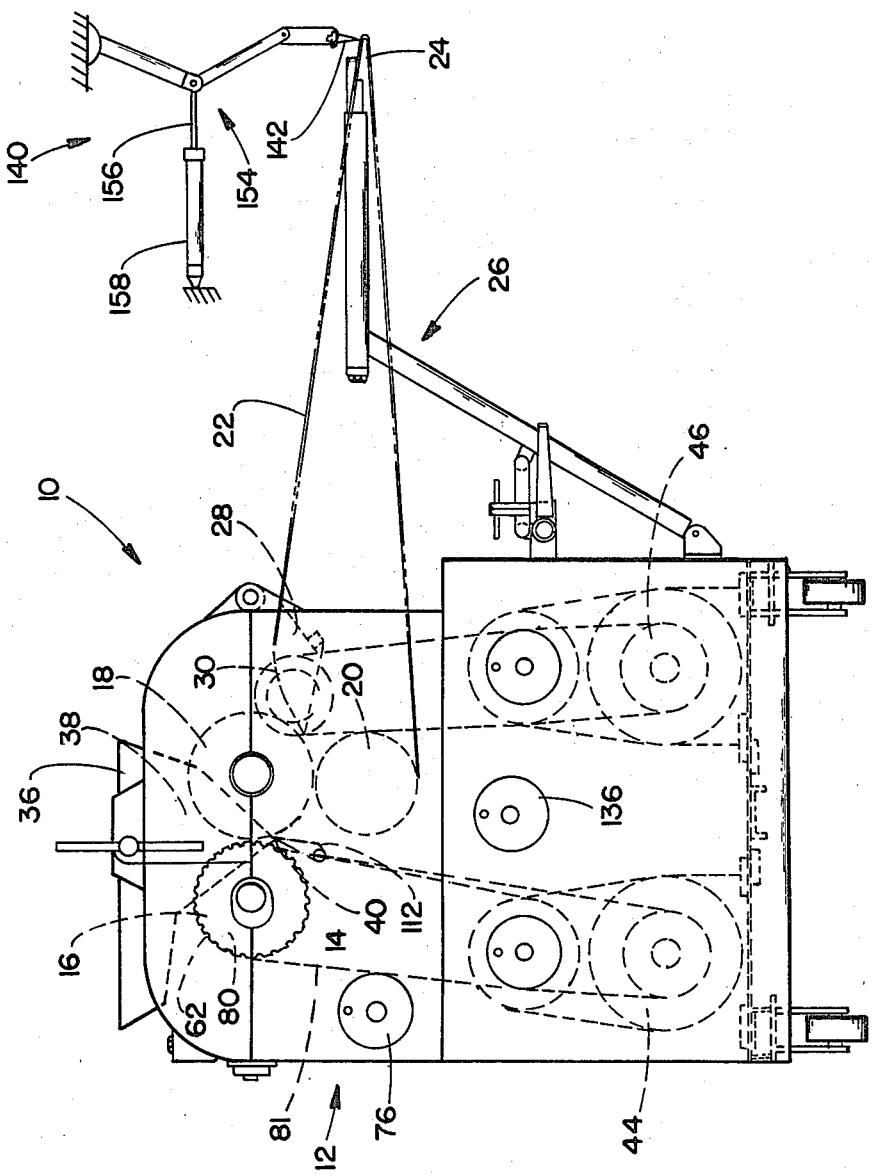
FIG. 1 is a side elevational view of a food product forming apparatus in accordance with the present invention.

The preferred embodiment of the apparatus in accordance with the present invention is illustrated in FIG. 1 and generally designated 10. As shown therein, apparatus 10 includes a base or frame structure 12 having opposed sidewalls 14. Rotatably supported between the sidewalls 14 are a pair of rolls 16, 18. Positioned below roll 18 is a pressure roll 20. An endless belt 22 is looped around a nose bar 24 supported on a frame assembly 26, around a guide 28 and around pressure roll 20. As a result, a portion 30 of an upper run of belt 22 is biased into contact with a portion of the periphery of roll 18. Rolls 16, 18 are rotatably supported in opposed relationship below a hopper 36. Hopper 36 contains a quantity of feed material 38 and meters the feed material to a nip 40 defined by rolls 16, 18. Each roll 16, 18 is individually driven by variable speed drives 44, 46, respectively. Roll 16 is a feed roll and roll 18 is a die roll.

Figure 2:
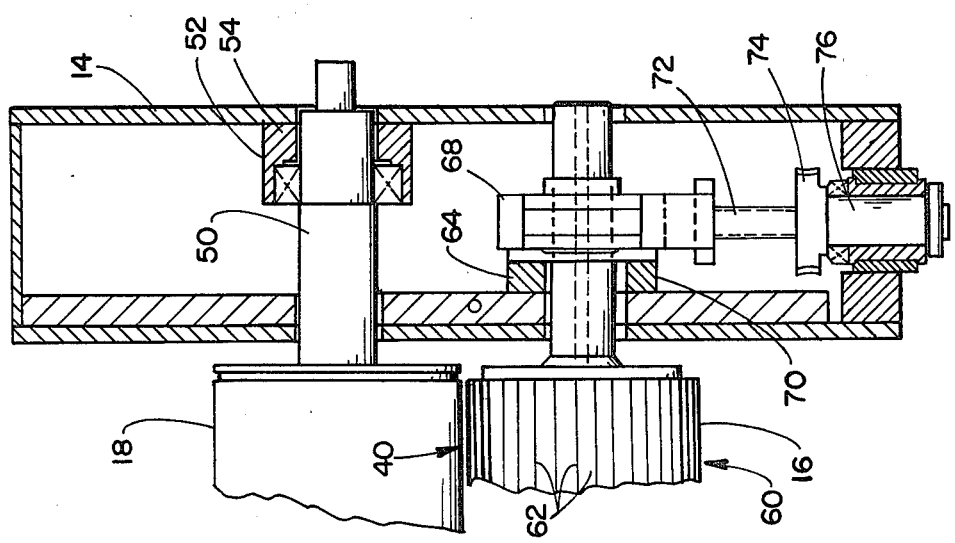
FIG. 2 is a fragmentary, cross-sectional view showing the mounting of a die roll and feed roll.

As best seen in FIG. 2, roll 18 includes a shaft 50 extending into a side 14 of base 12. The shaft is supported by a bearing 52 received within a suitable, open ended housing or bearing support structure 54 weldably or otherwise suitably secured to or formed with a portion of side 14. Feed roll 16 is supported for adjustable movement towards and away from die roll 18. Also as seen in FIG. 2, feed roll 16 includes a central, elongated cylindrical portion 60 having a plurality of elongated, circumferentially spaced grooves 62 formed therein. A shaft 64 extends through the cylindrical portion and is rotatably supported at its ends within a slide bearing 68. Slide bearing 68 rides on a suitable track structure 70 and is adjustable relative to frame 12 due to the cooperation of a threaded member 72 with a worm driven gear 74. Gear 74 rotates an internally threaded housing 76 which threadably engages member 72. Rotation of gear 74 causes member 72 to move towards and away from roll 18 thereby shifting the position of the feed roll. A suitable shaft nonrotatably secured to a hand wheel 76 extends between sidewalls 14 of base 12. The shaft has secured thereto gears (not shown) which mesh with gears 74 at each end of the feed roll.

As best seen in FIG. 1, it is presently preferred that the feed roll be driven through variable speed drive 44 by conventional sprocket and roller chain. A sprocket 80 is nonrotatably secured to one end of shaft 50. Endless roller 81 chain driven by an output sprocket of drive 44 rotates the feed roll.

It is preferred that the die roll be driven by a gear drive arrangement. As seen in FIG. 3, a driven gear 90 is nonrotatably secured to one end of a die roll shaft 50. Positioned adjacent gear 90 is a rotatably mounted shaft 92. Shaft 92 has secured thereto a pinion or drive gear 94 and an input sprocket 96. A roller chain, schematically shown in FIG. 1, rotates sprocket 96. Die roll 18 is rotated in the opposite direction of feed roll 16. The gear drive is preferred for the die roll since it facilitates replacement of the die roll. The die roll may merely be dropped onto the top of the machine and the gears will mesh to rotate the roll.

As best seen in FIGS. 7 and 8, die roll 18 includes an elongated, cylindrical member 102 defining a plurality of longitudinally spaced, continuous, circumferentially extending grooves or cavities 104. Each groove 104 includes a bottom wall 106 and opposed, spaced sidewalls 108. With the die roll adapted for the fabrication on a continuous basis of crinkle cut french fries, the sidewalls 108 define alternating peaks and valleys 110, 112, respectively. The grooves 104 shape the potato dough food product forced and compacted therein into the desired end food product shape.

Positioned below nip 40 defined by the rolls is a scraper blade 112 (FIG. 1). Scraper blade 112 is held in engagement with the peripheral surface of die roll 18 and assists in compacting or forcing the food product into the desired shape within the grooves. The compaction and hence the density of the product is also controlled by pressure roll 20. As best seen in FIG. 4, pressure roll 20 includes an elongated, hollow cylindrical member 122 which is covered with a resilient material 124 such as rubber. End shafts 126 are rotatably supported within bearings 128. A threaded member 132 is connected to shaft 126 and is threadably engaged by an internally threaded, gear rotated assembly 134. A gear 135 is rotated by a suitable gear (not shown) mounted on a shaft rotated by handwheel 136 (FIG. 1). This structure permits the pressure roll 20 to be moved towards and away from die roll 18 to thereby control the pressure which the belt portion 30 exerts on the periphery of the die roll. The adjustable pressure roll in conjunction with the scraper bar, the relative positioning of the feed roll and the die roll and the relative speeds of the rolls controls the density of the formed product.

A product is extracted from the grooves defined by the die roll by the endless belt 22. Endless belt 22 is preferably fabricated from a woven or like open-type material, most preferably woven cotton. This material when pressed into engagement with the die roll and separated therefrom as the die roll rotates creates separation forces, believed to comprise a suction and probably cohesive or surface-tension forces between the belt and the compacted product, which extracts the formed food product on a continuous basis from the grooves and deposits same on the belt. Belt 22 is driven through die roll 18 since it is pressed into contact with the die roll by the pressure roll 20. The formed product is deposited on the belt as an elongated strip having undulating sides. A suitable cutoff mechanism 140 which may be of any conventional type is positioned adjacent nose bar 24. Cutoff mechanism 140, as seen in FIG. 1, includes a knife or cutting bar 142 mounted for reciprocation. A conventional rocker arm assembly 154 moved by a piston rod 156 actuated by fluid cylinder 158 reciprocates the knife. This cutting assembly is illustrative of the many types which may be used. Many conventional cutters may be employed to cut the continuous strips into the desired lengths to define individual crinkle cut french fries.

Figure 5:
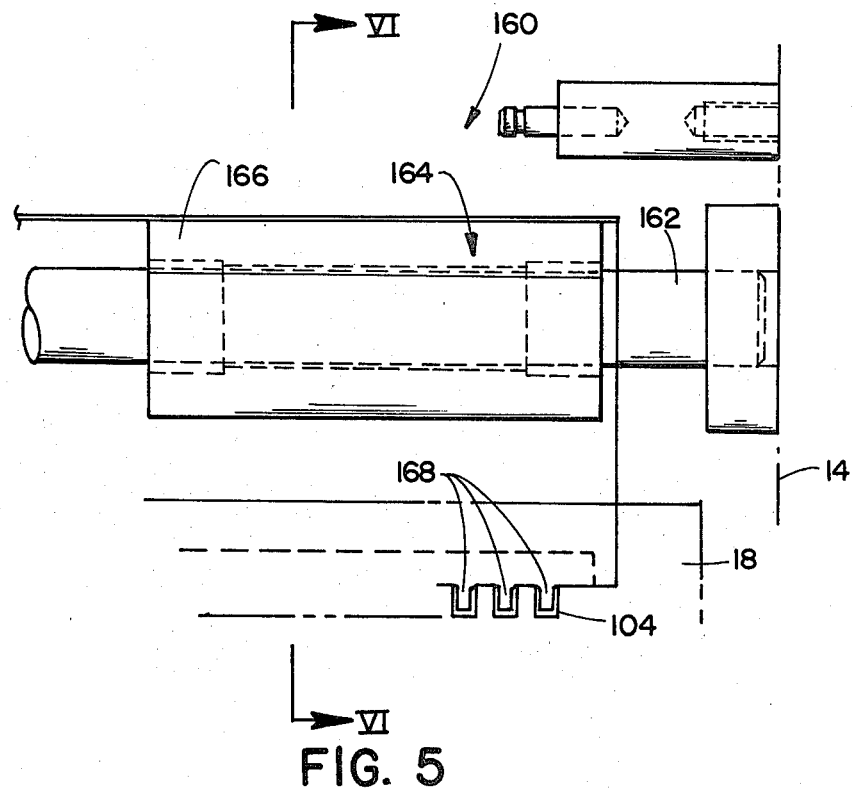
FIG. 5 is a fragmentary plan view of the stripper.
Figure 6:
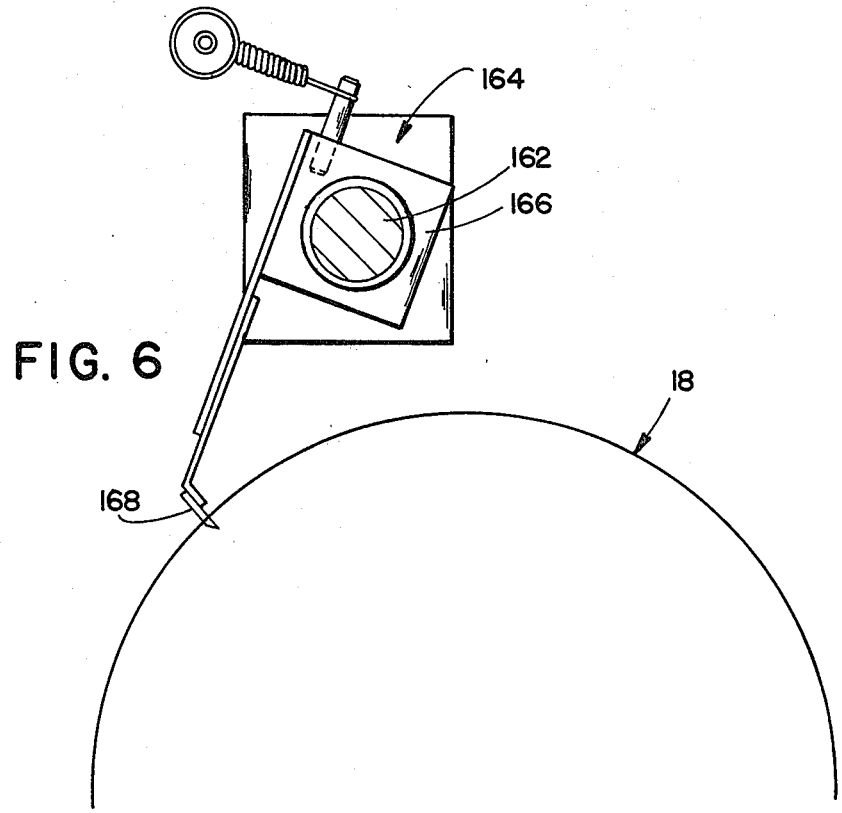
FIG. 6 is a fragmentary, cross-sectional view showing the stripper device.

As best seen in FIGS. 5 and 6, it is presently preferred that a stripper subassembly 160 be supported on base 12 immediately adjacent die roll 18 and above belt 22. Stripper subassembly 160 includes an elongated shaft 162 extending between sides 14 of plate 12. A stripper member 164 is supported on shaft 162 for longitudinal movement relative thereto by bearings 166. Member 164 defines a plurality of fingers 168 dimensioned to extend within the grooves defined by the die roll. As die roll 18 rotates, member 164 will shift back and forth along shaft 162 as the fingers 168 track within the grooves. Should a formed food product not be extracted from the grooves by the suction created by the belt, the strippers will engage the product and extract same from the individual grooves.

Although a crinkle cut forming groove has been illustrated as being defined by the die roll, other shaped cavities or grooves may be formed in the die roll. For example, straight-sided grooves could be formed therein to fabricate a plain or rectangular in cross section french fry on a continuous basis. Further, apparatus in accordance with the present invention may fabricate other shaped food products by machining or engraving different shapes in the die roll. For example, potato rings or animal-type characters could be defined by the die roll. Relatively unlimited shapes and sizes may be fabricated by the machine. This is an advantage which is heretofore unknown to the potato industry.

Also, it is presently preferred that feed roll 16 be hollow and that the shaft extending therefrom have a through bore formed therein permitting a controlled temperature fluid to be circulated within the feed roll. Circulation of a controlled temperature fluid will control the temperature of the feed material 38 and thereby increase the efficiency of operation of the apparatus.

OPERATION

A suitable potato feed material is prepared and deposited within hopper 36. The feed material could, for example, be formed by peeling and slicing potatoes into ¼-inch slices. The slices may then be steam cooked for between 9 and 12 minutes at 200° F. The cooked potatoes may then be riced in a grinder and put in a mixer and potato flakes, binders and seasonings are added. The material would then be mixed into a homogenous potato dough. The dough would be sheeted and cooled to about 75°-80° F.

The potato dough is then deposited within hopper 38 and metered to nip 40 by feed roll 16. As seen in FIG. 7, the grooves in the feed roll engage the dough and force it against die roll 18 and into grooves or cavities 140. Further control of the temperature of the dough to maintain proper consistence may be obtained, as set forth above, by circulation of a temperature controlled liquid through the feed roll.

The food medium is further forced into the grooves by the scraper bar and the pressure roll 20. Control of the relative speeds of rotation of rolls 16, 18, the spacing and hence the variable nip 40 and positioning of roll 20 controls the compaction and/or density of the formed food product. Belt 22 creates extraction forces as it separates from roller 18 and extracts the product from the cavities defined by the die roll. Stripper assembly 160 insures that any product left in the cavities is fully removed and deposited on the belt. The elongated strips of formed food product are then cut by the cutter bar assembly into predetermined individual lengths.

The apparatus and method in accordance with the present invention permit a crinkle cut french fry to be fabricated on a continuous basis. Further, the die roll 18 may be formed with special designs or shaped cavities to provide a relatively unlimited number of unique and different shaped potato food products.

An apparatus in accordance with the present invention is capable of relatively high production rates when compared to prior devices used to shape a potato dough. These rates are obtained without damaging the starch cells in the potatoes thereby insuring the quality of the finished potato product. By permitting the user to change the configuration of the die roll, a wide latitude of product designs may be fabricated.

It is presently preferred that the rolls and base or frame 12 be fabricated primarily from stainless steel. A potato product is capable of picking up the color of other metals. The stainless will not, however, discolor the potato product. Further, such material increases the ease of cleaning of the machine. As set forth above, belt 22 is preferably a woven cotton belt, which best provides the forces which extract the formed product from the die roll as the belt and roll separate.

In view of the foregoing description, those of ordinary skill in the art will undoubtedly envision various modifications to the present invention which would not depart from the inventive concepts disclosed herein. It is, therefore, expressly intended that the above description should be considered as that of the preferred embodiment. The true spirit and scope of the present invention may be determined by reference to the appended claims.

The embodiments of the invention in which an exclusive property or privilege is claimed are defined as follows:

1. A method of forming mutually segregated elongated narrow strips of food product from a potato dough, comprising the steps of:
   supplying a flowable potato dough material, including potatoes and a binder mixed together, into a nip area defined by a die roll and a feed roll, the die roll defining a plurality of generally parallel laterally adjacent annularly-extending cavities;
   said cavities each having a bottom wall and opposed sidewalls forming circumferentially-extending grooves, and said opposed sidewalls of said grooves being disposed in plan to define an alternating laterally zig-zag excursion, so that strips of dough shaped therein have a crinkle configuration;
   rotating the die roll and the feed roll in opposite directions to force the potato dough into said zig-zag grooves;
   compacting and shaping the dough within said zig-zag grooves, and restricting the dough from forming a continuous sheet or layer between adjacent grooves, by placing an endless belt in contact with a portion of the periphery of the die roll and applying pressure against the die roll and belt with a resilient pressure roll; and
   extracting the mutually separate crinkle-shaped strips of dough from the zig-zag grooves and depositing the shaped dough strips upon the belt in side-by-side mutually spaced and generally parallel dispositions, said extracting step being accomplished as the belt separates from the die roll.

2. A method as defined by claim 1 further including the step of cutting the elongated strips of formed, compacted dough into individual lengths to form individual french fry-type potato products.

3. A method as defined by claim 2 further including the step of placing a scraper bar below the rolls and into contact with the die roll to assist in forcing and compacting the dough into the die roll grooves.

4. A method as defined by claim 3 further including the step of stripping the grooves of any nonextracted shaped dough after the extracting step.

* * * * *